United States Patent [19]

Van Gerwen

[11] 3,801,934

[45] Apr. 2, 1974

[54] FILTER FOR BINARY PULSE SIGNALS

[75] Inventor: Petrus Josephus Van Gerwen, Emmasingel, Netherlands

[73] Assignee: U.S. Philips Corporation, New York, N.Y.

[22] Filed: Oct. 12, 1972

[21] Appl. No.: 296,766

[30] Foreign Application Priority Data

Oct. 16, 1971 Netherlands ........................ 7114263

[52] U.S. Cl. ................................................ 333/70 T
[51] Int. Cl. ............................................... H03h 7/28
[58] Field of Search .................................... 333/70 T

[56] References Cited

FOREIGN PATENTS OR APPLICATIONS 1,168,154 10/1969 Great Britain ..................... 333/70 T

*Primary Examiner*—Archie R. Borchelt
*Assistant Examiner*—Wm. H. Punter
*Attorney, Agent, or Firm*—Frank R. Trifari

[57] ABSTRACT

In a transversal filter for binary pulse signals provided with a shift register whose elements are connected through weighting networks to a combination network, exact zero points of the amplitude-versus-frequency characteristics are realized in spite of a relatively low number of shift register elements and associated weighting networks. At least two sets of weighting networks for forming transfer functions of alike shape, and each limiting the pulse spectrum in its bandwidth are connected to the shift register while corresponding weighting networks in adjacent sets of weighting networks are separated from one another by a prescribed number of shift register elements and the output signals from the different sets of weighting networks are combined in the combination network.

6 Claims, 10 Drawing Figures

FILTER FOR BINARY PULSE SIGNALS

The invention relates to a filter for binary pulse signals derived from a separate signal source controlled by a clock pulse generator. The filter is provided with a shift register connected to the signal source and has a number of shift register elements whose contents are shifted by a shift pulse generator connected to the shift register at a shift frequency which is equal to a multiple of the clock frequency. The shift register elements are connected through weighting networks to a combination network such as is used, for example, in pulse code modulation, synchronous telegraphy and the like. The weighting networks may be formed as damping resistors, amplifiers, controlled current sources and the like.

As already described in Netherlands Pat. application No. 6514831 a filter of this kind is particularly suitable for pulse transmission because arbitrary amplitude-versus-frequency characteristics having linear phase-versus-frequency characteristics can be obtained with satisfactory approximation, while the cut-off frequency of the filter follows the clock frequency in case of variation of the clock frequency while maintaining the form of the transfer function. Furthermore a filter of this kind does not contain any reactive components so that this filter is only built up of resistors and active elements, which is an advantage particularly when integrating such filters in a semiconductor body. The approximation of a desired transfer function improves as the number N of shift register elements and associated weighting networks increases. For example, FIGS. 5 and 6 of the above-mentioned Patent application show a cosine-shaped amplitude-versus-frequency characteristic desired for a lowpass filter and the approximation for $N = 14$ and $N = 24$, respectively. It is found that, at the cut-off frequency, the deviation of the approximation owing to this increase of $N$ is only reduced to a slight extent and the corresponding attenuation at the cut-off frequency is only increased from the value of 19 dB for $N = 14$ to a value of 24 dB for $N = 24$ as is shown in FIG. 7. However, when a very high attenuation of 40 dB or more is desired at the cut-off frequency, for example, for the additional transmission of a pilot signal, an extraordinarily large number of, for example, 150 to 200 shift register elements and associated weighting networks is required for this purpose so that the integration of the filter in a semiconductor body can hardly be realized.

An object of the invention is to provide a novel conception of a filter of the kind described in the preamble, in which all advantageous properties are maintained and in which, despite a relatively slight number of shift register elements and associated weighting networks, exact zero points of the amplitude-versus-frequency characteristic can be realized.

The filter according to the invention is characterized in that of the successive shift register elements a first group of $k$ successive shift register elements is connected to a first set of weighting of networks for forming a first transfer function H($\omega$) limiting the pulse spectrum in its bandwidth. Furthermore at least a second group of $k$ successive shift register elements is connected to a second set of weighting networks for forming a second transfer function $D{\cdot}H(\omega)$ which is similar to the first transfer function, where $D$ is a constant, corresponding weighting networks of different sets being separated from one another by V shift register elements. The output signals from the weighting networks of the different sets are combined in the combination network so as to suppress the components of the pulse spectrum at suitable positions in the transmission band.

The invention and its advantage will now be described in detail with reference to the figures.

FIG. 4 shows a filter according to the invention, while

FIG. 7 shows a modification of the filter shown in FIG. 4 according to the invention, while

Figure 1:
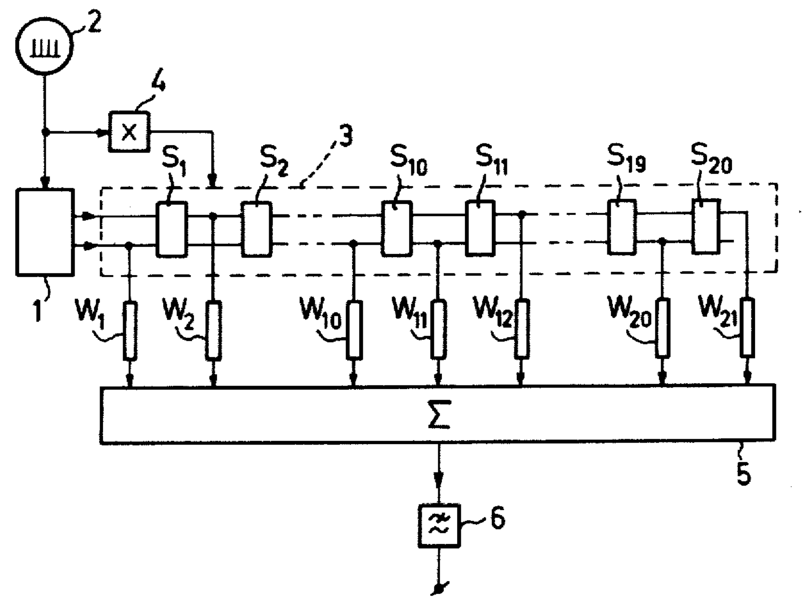
FIG. 1 shows a known filter as described in the above-mentioned patent application.

The known filter in FIG. 1 is adapted to the filtering of binary pulse signals which are derived from a signal source 1. Signal source 1 is synchronized by a clock pulse generator 2 having a clock frequency $f_T$ of, for example, 2 kHz which corresponds to a clock period T of 0.5 msec.

As described in the above-mentioned Patent application, the filter comprises a shift register 3 connected to the signal source 1 and having a number of, for example, 20 shift register elements $S_1 - S_{20}$ whose contents are shifted by a shift pulse generator 4 connected to the shift register 3 at a shift frequency $f_S$ which is equal to a multiple of the clock frequency $f_T$. The shift register elements $S_1$–$S_{20}$ are connected through weighting networks $W_1$–$W_{21}$ to a combination network 5. Shift register 3 is formed, for example, by a plurality of bistable triggers and shift pulse generator 4 is formed by an astable multivibrator. This astable multivibrator is synchronized by clock pulse generator 2 and provides shift pulses at a shift period $s$ of, for example, 0.1 msec. which corresponds to a shift frequency $f_S = 1/s = 5\ f_T$.

A desired transfer function $G_0(\omega)$ is obtained at this shift period $s$ by suitable proportioning of the respective weighting coefficients $C_{+10}, C_{+9}, \ldots, C_{+1}, C_0, C_{-1}, \ldots, C_{-9}C_{-10}$ of the weighting networks $W_1, W_2, \ldots, W_{10}, W_{11}, W_{12}, \ldots, W_{20}, W_{21}$. It has been mathematically shown in the above-mentioned Patent application that with N shift register elements and with weighting networks which, going from the ends of the shift register 3 to the centre, are pairwise equal while their weighting coefficients $C_p$ satisfy:

$$C_{-p} = C_p \text{ with } p = 1, 2, \ldots, N/2 \qquad (1)$$

a transfer function is obtained whose amplitude-versus-frequency characteristic $G(\omega)$ *has the shape:*

$$G(\omega) = C_0 + \sum_{p=1}^{N/2} 2C_p \cos (p\omega s) \qquad (2)$$

and whose phase-versus-frequency characteristic $\phi(\omega)$ has an accurately linear variation in accordance with:

$$\phi(\omega) = -(N\omega s)/2 \quad (3)$$

The amplitude-versus-frequency characteristic thus forms a Fourier series developed in cosine terms whose periodicity $\Omega$ is given by:

$$\Omega s = 2\pi \quad (4)$$

To realize a desired amplitude-versus-frequency characteristic $G_o(\omega)$ the coefficients $C_p$ in the Fourier series may be determined with the aid of the relation:

$$C_p = (1/\Omega) \cdot \int_0^{\Omega} G_0(\omega) \cdot \cos(p\omega s) \cdot d\omega \quad (5)$$

The shape of the amplitude-versus-frequency characteristic is then completely determined, but the periodical behaviour of the Fourier series results in the desired amplitude-versus-frequency characteristic repeating at a periodicity $\Omega$ in the frequency spectrum so that additional passbands of the filter are formed. In practice these additional passbands are, however, not annoying since for a sufficiently large value of the periodicity $\Omega$, and hence according to formula (4) for a sufficiently small value of the shift period $s$, the frequency interval between the desired and the next additional passband is sufficiently large to permit the suppression of the additional passbands with the aid of a simple cut-off filter 6 at the output of the combination network 5 without the amplitude-versus-frequency characteristic and the linear phase-frequency characteristic being noticeably influenced in the desired passband. The cut-off filter 6 is formed, for example, by a lowpass filter consisting of a resistor and a capacitor.

An essential extension of the possibilities of use is obtained by also deriving from the shift register elements the inverted pulse signals which in the case of shift register elements formed as bistable triggers are available at the outputs of the triggers in addition to the pulse signals. As a result negative coefficients $C_p$ in the Fourier series can be realized. Furthermore an amplitude-versus-frequency characteristic $G(\omega)$ in the form of a Fourier series developed in sine terms can be obtained with a linear phase-versus-frequency characteristic. To this end the weighting networks, going from the ends of the shift register 3 to the center, are again rendered pairwise equal but the central weighting network $W_{11}$ now has a weighting coefficient $C_0$ which is equal to zero and the inverted pulse signal is applied to the weighting networks $W_{12} - W_{21}$ following this weighting network $W_{11}$ so that for N shift register elements the weighting coefficients $C_p$ satisfy:

$$C_{-p} = -C_p \text{ with } p = 1, 2, \ldots, N/2 \quad (6)$$

For the transfer function there applies:

$$G(\omega) = \sum_{p=1}^{N/2} 2C_p \sin(p\omega s) \quad (7)$$

$$\phi(\omega) = -(N\omega s)/2 + \pi/2$$

The linear phase-versus-frequency characteristic $\phi(\omega)$ according to formula (7) thus exhibits a phase shift $\pi/2$ with respect to $\phi(\omega)$ according to formula (3). The coefficients $C_p$ in the Fourier series may then be determined with the aid of the relation:

$$C_p = (1/\Omega) \cdot \int_0^{\Omega} G_0(\omega) \cdot \sin(p\omega s) \cdot d\omega \quad (8)$$

By suitable proportioning of the coefficients of the weighting networks any arbitrary amplitude-versus-frequency characteristic with a linear phase-versus-frequency characteristic can be realized in this manner. In addition to transfer functions having a linear phase-frequency characteristic, transfer functions can be realized with the filter of FIG. 1 whose phase-versus-frequency characteristic does not exhibit a linear variation. To this end the cosine series according to formula (2) is used for the real part and the sine series according to formula (7) is used for the imaginary part of this transfer function while the weighting coefficient of each weighting network is formed by the algebraic sum of the relevant coefficient $C_p$ in accordance with formula (5) and the relevant coefficient $C_p$ in accordance with formula (8).

The construction of a lowpass filter having a linear phase-versus-frequency characteristic for the pulse signals of clock frequency $f_T = 1/T$ will now be described with reference to the foregoing considerations. The amplitude-versus-frequency characteristic has a sinusoidal variation up to half the clock frequency $f_o = 1/2T$ and suppresses all frequency components above the frequency $f_o$. This amplitude-versus-frequency characteristic is shown by the broken-line curve $a$ and may be mathematically written as:

$$G_0(\omega) = \begin{cases} \sin(\omega T), & \omega < \omega_0 \\ 0, & \omega > \omega_0 \end{cases} \quad (9)$$

in which $\omega_o$ is the radial frequency associated with half the clock frequency $f_o$, with $\omega_o = 2\pi f_o = \pi/T$.

In accordance with the previous explanation the Fourier series developed in sine terms according to formula (7) may be used for realizing $G_o(\omega)$ according to formula (9) in which the coefficients $C_p$ are obtained by substitution of formula (9) into formula (8). To ensure that the frequency interval between the desired and the next additional passband has a sufficiently large value, the ratio between the cut-off frequency $\omega_o$ of the filter and the periodicity $\Omega$ is to be rendered sufficiently large, for example, $\omega_o/\Omega = 1/10$. With this ratio the coefficients $C_p$ and hence the weighting networks $W_1$–$W_{21}$ are fully determined and particularly the following value is found for these coefficients $C_p$:

$$C_p = 4/5\pi \cdot \sin(\pi p/5)/1-0.04p^2 \quad (10)$$

Using the mentioned condition: $\omega_o/\Omega = 1/10$, the relation according to formula (4): $\Omega s = 2\pi$ and the relation $\omega_o = \pi/T$, the relation $s = T/5$ is found for the shift period $s$ of shift register 3. This means that the shift pulse generator 4 connected to the clock pulse generator 2 must operate as a frequency multiplier having a multiplication factor of 5.

The amplitude-versus-frequency characteristic $G(\omega)$ may be determined in conformity with the Fourier series according to formula (7) with $N/2$ sine terms with the aid of the calculated values of the weighting coefficients $C_p$ and the value of the shift period $s$. In the described embodiment $N/2 = 10$ and the approximation thus obtained of the desired amplitude-versus-frequency characteristic $a$ is represented by curve $b$ in FIG. 2. When the number $N/2$ of the sine terms in the Fourier series (7) is increased to 20, i.e. an increase of the numbers $N$ and $(N+1)$ of shift register elements and weighting networks, respectively, from the values 20 and 21 to the values 40 and 41, respectively, the approximation of the desired curve $a$ shown by curve $c$ in FIG. 2 is obtained.

Figure 2:
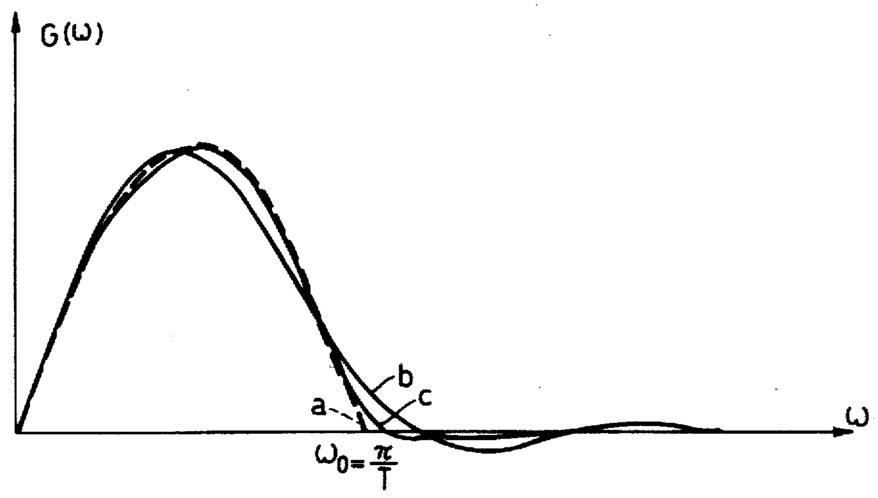
FIG. 2 shows some amplitude-versus-frequency characteristics.
Figure 3:
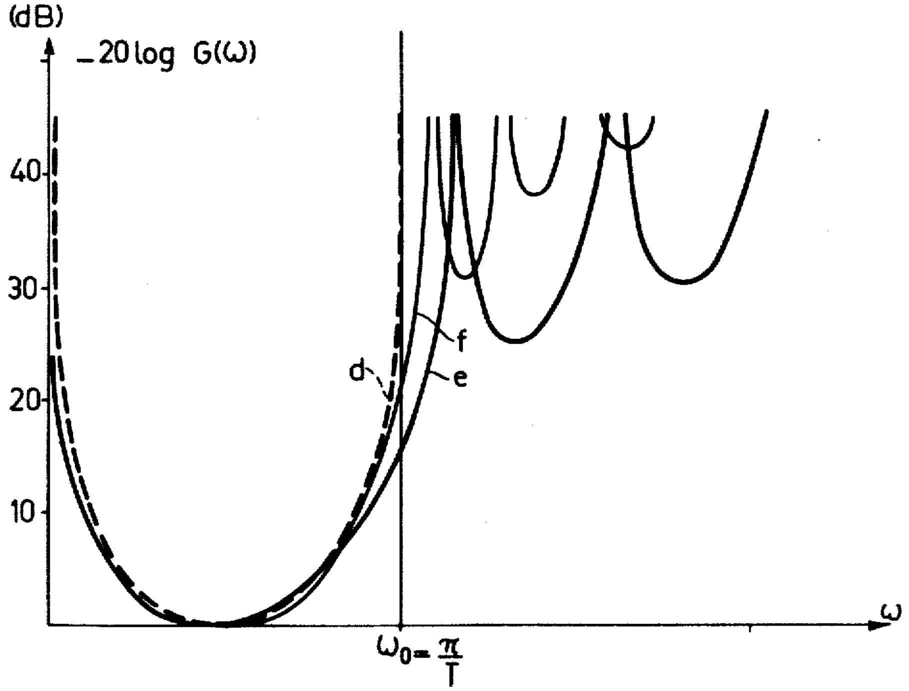
FIG. 3 shows the corresponding attenuation-versus-frequency characteristics to explain the operation of the filter of FIG. 1.

The influence of the increase of the number $N/2$ of the terms in the Fourier series (7) is more clearly shown in FIG. 3 in which the attenuation-versus-frequency characteristics $d$, $e$, $f$ corresponding to the amplitude-versus-frequency characteristics $a$, $b$, $c$ in FIG. 2 are shown with the aid of the relation $-20\log G(\omega)$ measured in dB. FIG. 3 shows that the increase of $N$ both results in a better approximation of the desired attenuation-versus-frequency characteristic $d$ in the pass band $\omega<\omega_o$ and in an increase of the minimum attenuation in the stop band $\omega>\omega_o$. However, it is also found that, as a result of the increase of N, the deviation of the approximation is only reduced to a slight extent at the cut-off frequency $\omega_o$. The attenuation at the cut-off frequency $\omega_o$ for $N=20$ has the value of 15 dB (compare curve $e$ in FIG. 3) and for $N = 40$ it has the value of 21 dB which is only 6 dB higher (compare curve $f$ in FIG. 3).

However, when a very high attenuation of 40 dB or more is desired exactly at this cut-off frequency $\omega_o$, for instance to be able to transmit, in addition to the pulse signals, a pilot signal without noticeable influence by the pulse signals, a very large number of, say, 150 to 200 terms in the Fourier series (7) is necessary for this purpose. This means that the filter must comprise a number of 300 to 400 shift register elements and associated weighting networks, which very large numbers prevent a practical integration of the filter in a semiconductor body. On the one hand the tolerances in the dimensions of the substrate surface, which is necessarily large due to this large number, can no longer be maintained and on the other hand the mutual ratios of the weighting coefficients become so large at this large number that the weighting networks can no longer be realized with the required accuracy.

Figure 4:
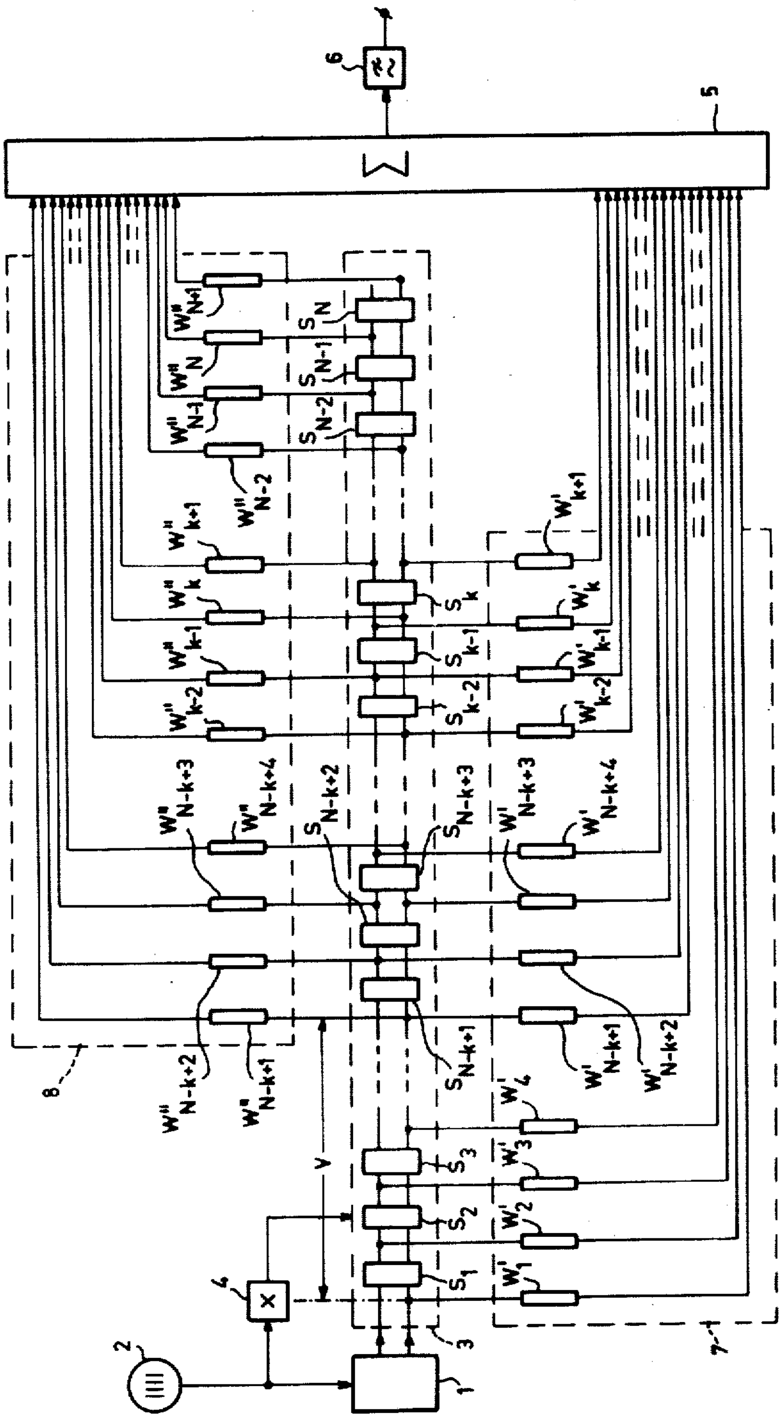

While maintaining all advantageous properties mentioned in the foregoing, exact zero points of the amplitude-versus-frequency characteristic are realized in the filter according to the invention shown in FIG. 4 in spite of a relatively slight number of shift register elements and associated weighting networks.

For this purpose a first group of $k$ successive shift register elements $S_1$–$S_k$ of the N successive shift register elements $S_1$–$S_N$ in the filter of FIG. 4 is connected to a first set 7 of weighting networks $W'_1 - W'_{k+1}$ for forming a first transfer function $H(\omega)$ limiting the pulse spectrum in its bandwidth, and furthermore at least a second group of $k$ successive shift register elements $S_{N-k+1} - S_N$ is connected to a second set 8 of weighting networks $W''_{N-k+1} - W''_{N+1}$ for forming a transfer function $D{\cdot}H(\omega)$ which is similar to the first transfer function, where $D$ is a constant, corresponding weighting networks $W'_1$, $W''_{N-k+1}$; $W'_2$, $W''_{N-k+2}$; . . . .; $W'_{k+1}$, $W''_{N+1}$ of the different sets 7, 8 being separated from one another by V shift register elements, the output signals from the weighting networks $W'_1 - W'_{k+1}$ and $W''_{N-k+1} - W''_{N+1}$ of the different sets 7, 8 being combined in the combination network 5 so as to suppress components of the pulse spectrum at suitable positions in the transmission band.

To explain the operation of the filter of FIG. 4 the constant D is assumed to have the value of 1, as a first example; i.e. the two sets 7, 8 of weighting networks $W'_1$–$W'_{k+1}$ and $W''_{N-k+1}$–$W''_{N+1}$ are used for forming the same transfer function $H(\omega)$. Furthermore it is assumed that in the combination network 5 the output signals of the second set 8 of weighting networks are subtracted from the output signals of the first set 7 of weighting networks. Hence, the complete transfer function $F(\omega)$ of the filter thus obtained is composed of the transfer function $H(\omega)$ realized with the aid of the first set 7 of weighting networks and the transfer function realized with the aid of the second set 8 of weighting networks:

$$e^{-j\omega Vs}\cdot H(\omega) \tag{11}$$

in which the factor $e^{-j\omega Vs}$ indicates the constant delay Vs experienced by the pulse signals applied to the filter and caused by V shift register elements $S_1$–$S_{N-k}$ for a shift period $s$ (in fact $V=N-k$ in FIG. 4). As a result of the subtraction in the combination network 5 the following relation is found for $F(\omega)$:

$$F(\omega) = H(\omega) - H(\omega)\cdot e^{-j\omega Vs} \tag{12}$$

When this constant delay Vs is rendered equal to an integral multiple of the clock period T, for instance equal to 2T, we can write for $F(\omega)$:

$$F(\omega) = H(\omega)\cdot(1-e^{-2j\omega T}) \tag{13}$$

or after some manipulation $$F(\omega) = C_s{\cdot}H(\omega)\cdot e^{-j\omega T}\cdot\sin(\omega T) \tag{14}$$

in which $C_s$ is a constant.

The pulse spectrum applied to the filter of FIG. 4 thus undergoes a limitation in its bandwidth in conformity with the transfer function $H(\omega)$, a constant delay amounting to a clock period T in conformity with the factor $e^{-j\omega T}$ and also a multiplicative amplitude variation in conformity with the absolute value $S(\omega)$ of sin $(\omega T)$.

Figure 5:
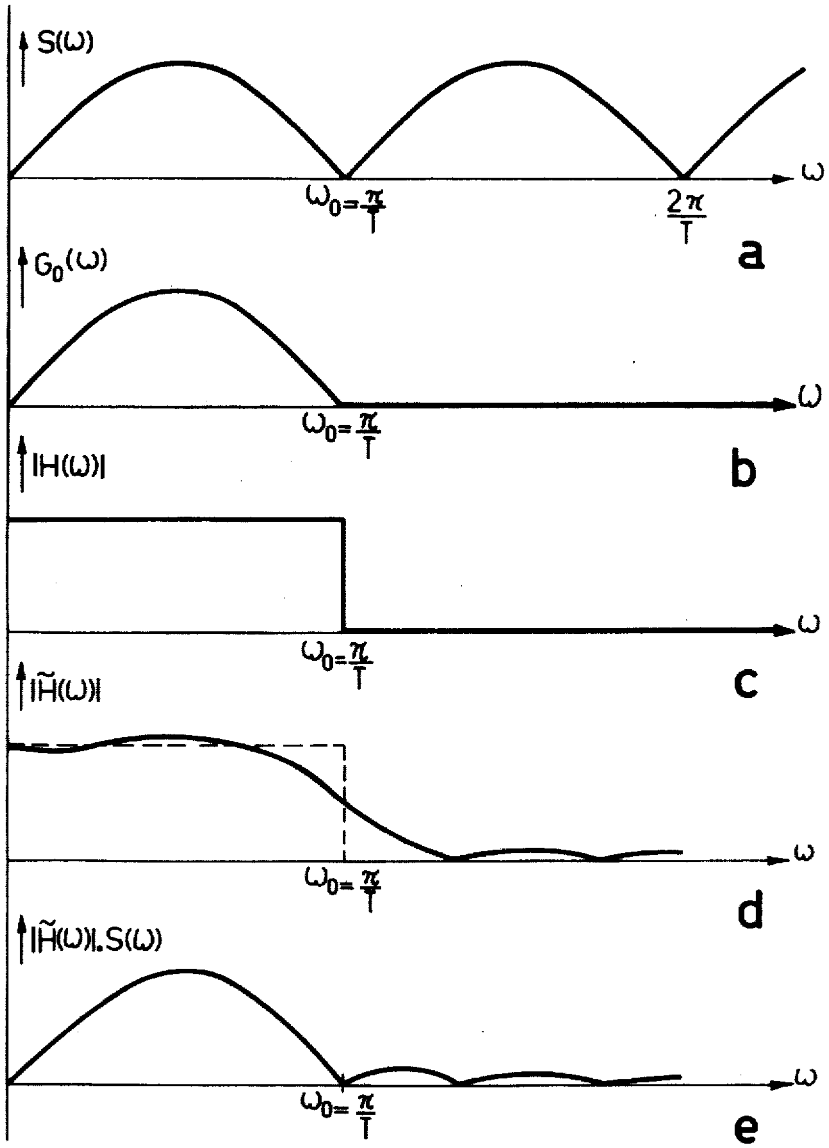
FIGS. 5 and 6 show some amplitude-versus-frequency characteristics to explain the operation of the filter of FIG. 4.

The variation of $S(\omega)$ is shown at $a$ in FIG. 5, from which it is apparent that $S(\omega)$ has an exact zero point at the frequency $\omega = 0$ and at the regularly distributed frequencies $\omega$ 32 $n\omega_o=n\pi/T$ with $n=1, 2, 3, \ldots$ Accordingly the filter according to FIG. 4 completely suppresses the components of the pulse spectrum at these frequencies $\omega=0$ and $\omega=n\pi/T$ because $S(\omega)$ is a multiplicative constituent part of the complete transfer function $F(\omega)$ as is evident from formula (14).

The variation of the transfer function $H(\omega)$ limiting the pulse spectrum in its bandwidth for a desired complete transfer function $H(\omega)$ of the filter is determined with the aid of formula (14) in which the ideal delay T in conformity with the factor $e^{-j\omega T}$ can be left out of consideration. When, for example, the amplitude-versus-frequency characteristic $G_o(\omega)$ already mentioned in the foregoing is desired, which characteristic is shown once more at *b* in FIG. 5, the following relation for the absolute value $|H(\omega)|$ of $H(\omega)$ is obtained by substitution of $G_o(\omega)$ according to formula (9) into formula (14) for $F(\omega)$ and by omission of the constant $C_s$ and the factor $e^{-j\omega T}$.

$$|H(\omega)| \cdot \sin(\omega T) = \begin{cases} \sin(\omega T), & \omega < \omega_0 \\ 0, & \omega > \omega_0 \end{cases} \quad (15)$$

from which the following relation for $|H(\omega)|$ results:

$$|H(\omega)| = \begin{cases} 1, & \omega < \omega_0 \\ 0, & \omega > \omega_0 \end{cases} \quad (16)$$

FIG. 5 shows at *c* the variation of $|H(\omega)|$ according to formula (16). FIG. 5 also illustrates that for the realization of $G_o(\omega)$ shown at *b* with the aid of a filter whose complete transfer function $F(\omega)$ comprises $S(\omega)$ shown at *a* as a multiplicative constituent part, the absolute value $|H(\omega)|$ of the transfer function $H(\omega)$ limiting the pulse spectrum in its bandwidth must have a variation with $\omega$ as shown at *c*.

In the manner extensively explained in the foregoing, $|H(\omega)|$ according to formula (16) can be realized with the aid of a Fourier series developed in cosine terms in accordance with formula (2) in which the number $k$ of the shift register elements in the two groups $S_1$–$S_k$ and $S_{N-k+1}$ – $S_N$ must be substituted for N. The weighting coefficients $C'_p$ and $C''_p$ of the two sets 7, 8 of weighting networks (which are equal to each other) are then obtained by substituting formula (16) into a relation which is analogous to formula (5). Particularly the following values are found for these coefficients with due allowance for the values of clock frequency and shift frequency given with reference to FIG. 1:

$$C'_p = C''_p = \sin(\pi p/5)/\pi p \quad (17)$$

$$p = 1, 2, \ldots, k/2$$

The Fourier approximation $|\tilde{H}(\omega)|$ thus obtained for the absolute value $|H(\omega)|$ of the desired transfer function $H(\omega)$, which approximation comprises $k/2$ cosine terms, is determined thereby. For example, in the embodiment of FIG. 4 $k = 24$ and the corresponding $|\tilde{H}(\omega)|$ is shown at *d* in FIG. 5.

In spite of the fact that, exactly at the cut-off frequency $\omega_o = \pi/T$, this approximation $|\tilde{H}(\omega)|$ with only 12 cosine terms deviates to a considerable extent from the desired $|H(\omega)|$ according to formula (16), the approximation of the desired complete transfer function $F(\omega)$ according to formula (14) not only has a zero point at the frequency $\omega = 0$, but also has an accurate zero point at this cut-off frequency $\omega = \omega_o$ because the complete amplitude-versus-frequency characteristic $|F(\omega)|$ of the filter is obtained by multiplication of this approximation $|\tilde{H}(\omega)|$ by the absolute value $S(\omega)$ of $\sin(\omega T)$ which has an exact zero point at the frequencies $\omega = o$ and $\omega = \omega_o$. FIG. 5 shows at *e* the complete amplitude-versus-frequency characteristic $|\tilde{H}(\omega)| \cdot S(\omega)$ thus obtained for the filter shown in FIG. 4.

The function $S(\omega)$ utilized for obtaining the desired zero points in the complete transfer function $F(\omega)$ is repeated at a periodicity $\omega_o$ which, in accordance with the mentioned condition: $\omega_o/\Omega = 1/10$, is a factor of 10 smaller than the periodicity $\Omega$ of the function $H(\omega)$ limiting the pulse spectrum in its bandwidth. In itself, this small periodicity $\omega_o$ is a drawback particularly because the additional passbands of $S(\omega)$ immediately adjoin the desired passband $\omega < \omega_o$ of the filter as may appear from the variation of $S(\omega)$ with $\omega$ shown at *a* in FIG. 5. For the practical realization of the complete transfer function $F(\omega)$ of the filter these additional passbands are, however, not annoying because the transfer function $H(\omega)$, limiting the pulse spectrum in its bandwidth and having a periodicity $\Omega$ which is a factor of 10 higher, likewise is a multiplicative constituent part of $F(\omega)$ and consequently these additional passbands of $S(\omega)$ are suppressed by the high attenuation of $H(\omega)$ in the stop band $\omega > \omega_o$ as may appear from the complete amplitude-versus-frequency characteristic of the filter shown at *e* in FIG. 5.

The use of the steps according to the invention thus leads to a filter whose amplitude-versus-frequency characteristic, in spite of its realization with only a relatively slight number of shift register elements and associated weighting networks, completely suppresses the components of the pulse spectrum at the desired positions. Investigations have shown that in the known filter in FIG. 1 a number of 300 to 400 shift register elements and associated weighting networks is required for obtaining an attenuation of 40 dB, whereas under otherwise equal circumstances a number of only $N = V+k = 10 + 24 = 34$ shift register elements and $2(k+1) = 50$ weighting networks in the filter of FIG. 4 according to the invention an attenuation of 50 dB at the cut-off frequency $\omega_o$ is obtained without any difficulty. Thus, on the one hand a very high attenuation at the desired positions in the transmission band is ensured in spite of a reduction in the number of shift register elements by factors in the order of 6 to to 8, and on the other hand this considerable reduction in the number of shift register elements amply satisfies the conditions for practical integration of the filter in a semiconductor body both as regards the tolerances which must be maintained for the dimensions and as regards the accuracy requirements imposed on the weighting networks.

Instead of a subtraction of the output signals from the two sets 7, 8 of weighting networks, as in the example explained above, an addition of these output signals may alternatively be performed in the combination network 5 of the filter of FIG. 4. The following relation is found in the manner described hereinbefore for the complete transfer function $f(\omega)$ of the filter:

$$F(\omega) = H(\omega) + H(\omega) \cdot e^{-j\omega V s} \quad (18)$$

When, for instance the constant delay Vs is now rendered equal to T we can write for $F(\omega)$:

$$F(\omega) = H(\omega) \cdot (1 + e^{-j\omega T}) \quad (19)$$

or $$F(\omega) = C_c \cdot H(\omega) \cdot e^{-j\omega T/2} \cdot \cos(\omega T/2) \quad (20)$$

in which $C_c$ is a constant. In addition to the bandwidth limitation in accordance with the function $H(\omega)$ and the constant delay $T/2$ in accordance with the factor $e^{-j\omega T/2}$ the pulse spectrum applied to the filter now experiences a multiplicative amplitude variation in accordance with the absolute value $C(\omega)$ of cos $(\omega T/2)$.

Figure 6:
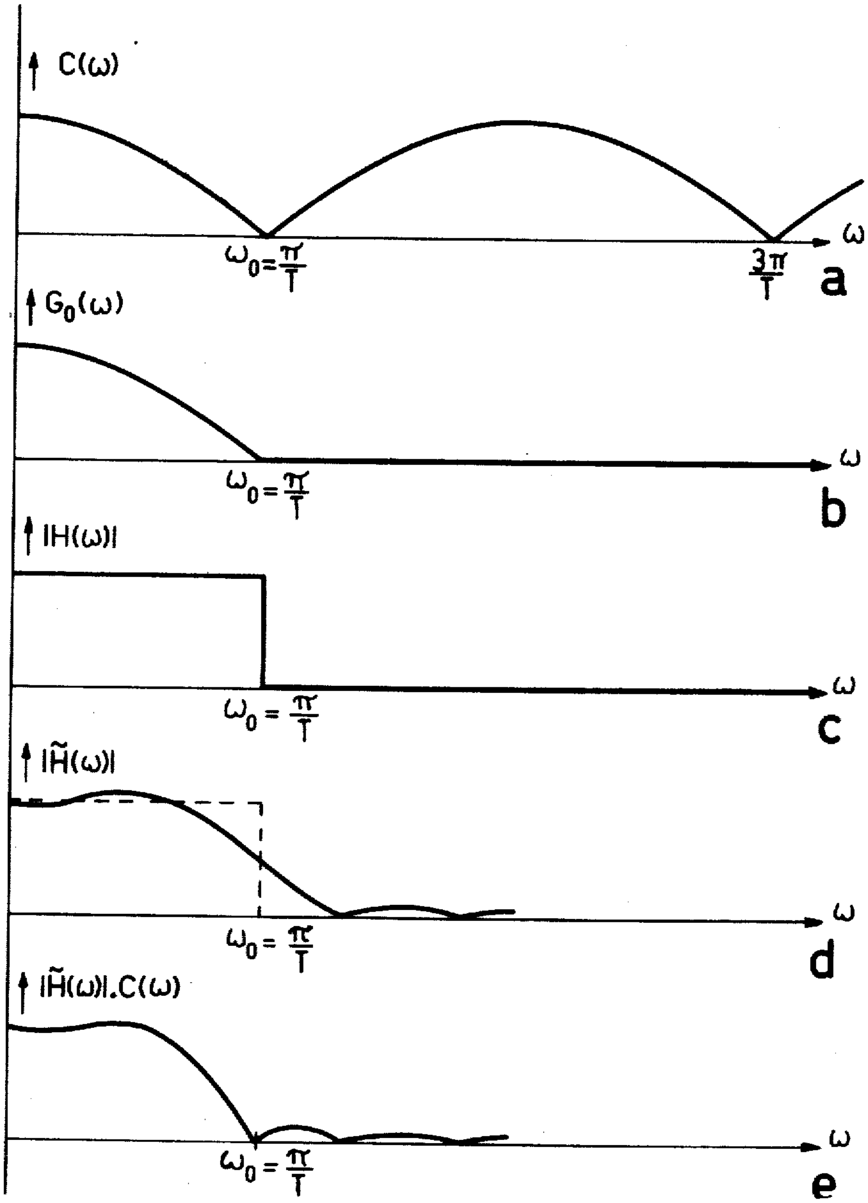

FIG. 6 shows at *a* the variation of $C(\omega)$, from which figure it is apparent that $C(\omega)$ exhibits a first zero point at $\omega = \omega_o = \pi/T$ and that the other zero points are separated by equal frequency distances $2\pi/T$. The variation of the absolute value $|H(\omega)|$ of the function $H(\omega)$ limiting the pulse spectrum in its bandwidth can be determined in a manner similar to that of the first example. When for $F(\omega)$ the amplitude-versus-frequency characteristic $G_o(\omega)$ shown at *b* in FIG. 6 is desired with a cosine-shaped variation up to half the clock frequency $\omega_o = \pi/T$, the variation shown at *c* in FIG. 6 is found for $H(\omega)$ with the aid of formula (20) for $|H(\omega)|$. This variation of $|H(\omega)|$ exactly corresponds to the relation given in formula (16) and may thus be realized in exactly the same manner with the aid of the values of the weighting coefficients given in formula (17). For completeness' sake the Fourier approximation $|H(\omega)|$ thus obtained is shown once more at *d* in FIG. 6 (compare *d* in FIG. 5). Although only an approximation $|H(\omega)|$ of the desired $|H(\omega)|$ in accrdance with formula (16) is obtained, the complete amplitude-versus-frequency characteristic $|H(\omega)| \cdot C(\omega)$ of the filter shown at *e* in FIG. 6 still exhibits an accurate zero point at the cut-off frequency $\omega = \omega_o$ owing to the multiplication of this approximation $|H(\omega)|$ by the absolute value $C(\omega)$ of $\cos(\omega T/2)$.

Instead of the values given in the above-mentioned examples, other values may alternatively be used for the delay Vs, in which in accordance with the delay rT equal to a multiple of the clock period T the following relation for the complete transfer function $F(\omega)$ of the filter is found:

$$F(\omega = C_s \cdot H(\omega) \cdot e^{-j\omega rT/2} \cdot \sin(\omega rT/2) \quad (21)$$

when in combination network 5 a subtraction of the output signals from the two sets 7, 8 of weighting networks is performed (compare formula (14)). In that case components of the pulse spectrum applied to the filter are suppressed at the frequencies:

$$\omega = 2m\ (\pi/rT) \quad (22)$$

$$m = 0, 1, 2, 3, \ldots$$

If an addition is performed in combination network 5, (compare formula (20)), the following relation applies to $F(\omega)$:

$$F(\omega) = C_c \cdot H(\omega) \cdot e^{-j\omega rT/2} \cdot \cos(\omega rT/2) \quad (23)$$

and components of the pulse spectrum are suppressed at the frequencies:

$$\omega = (2m+1) \cdot (\pi/rT) \quad (24)$$

$$m = 0, 1, 2, 3, \ldots$$

Figure 7:
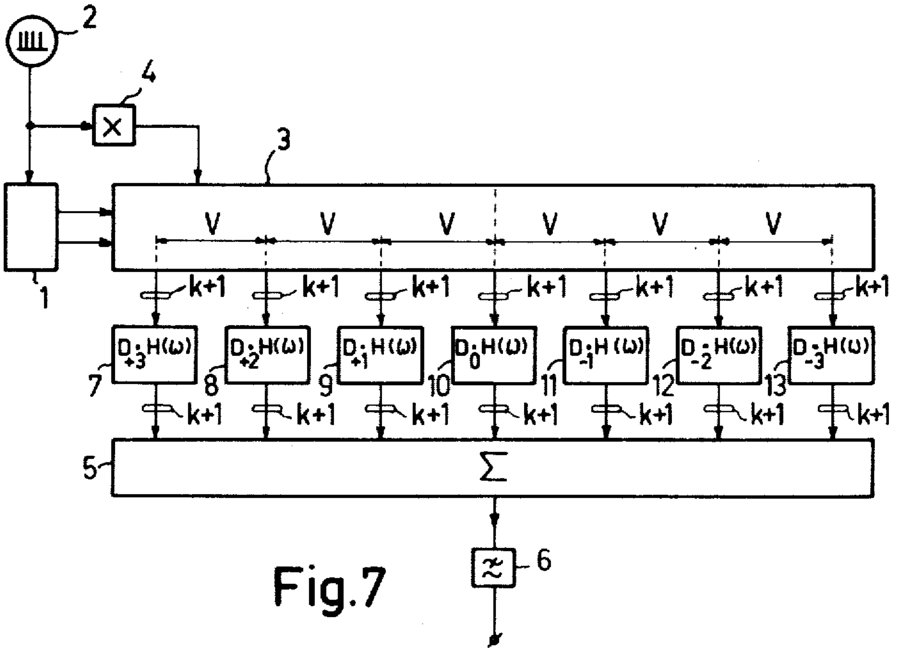

FIG. 7 shows a modification of the filter according to the invention shown in FIG. 4 in which different sets 7, 8, 9, 10, 11, 12, 13 of weighting networks are connected to the shift register 3. Each set 7–13 comprises $(k+1)$ weighting networks which are connected to a group of $k$ successive shift register elements. Since structure and connection of the different sets 7–13 in FIG. 7 correspond to structure and connection of the sets 7, 8 of FIG. 4, they are not shown in detail in FIG. 7 for the sake of simplicity. Also in FIG. 7 corresponding weighting networks in two adjacent sets 7, 8; 8, 9; . . . .; 12, 13 are separated from one another by V shift register elements. The different sets 7–13 are used for forming a series of similar transfer functions $D_x \cdot H(\omega)$ in which the constant $D_x$ for the respective sets 7, 8, 9, 10, 11, 12, 13 has the value $D_3$, $D_2$, $D_1$, $D_0$, $D_{-1}$, $D_{-2}$, $D_{-3}$ and in which the complete transfer function $F(\omega)$ of the filter in FIG. 7 is composed in a similar manner as for the filter in FIG. 4 from these functions $D_x \cdot H(\omega)$.

When the output signals of the different sets 7–13 are added in the combination network 5 and when furthermore the constant delay, which is caused by the shift register elements between the input of shift register 3 and the first weighting network of the central set 10 at a given shift period *s*, is left out of consideration, the central set 10 provides the following contribution to $F(\omega)$;

$$D_o \cdot H(\omega).$$

The sets 9 and 11 then jointly provide a contribution:

$$(D_1 e^{-j\omega Vs} + D_{-1} d^{-j\omega Vs}) \cdot H(\omega)$$

to $F(\omega)$ which contribution, assuming that $D_{-1} = D_1$, may be written as $$2D_1 \cos(\omega Vs) \cdot H(\omega).$$

Likewise the sets 8 and 12, and 7 and 13, assuming that $D_{-2} = D_2$ and $D_{-3} = D_3$, provide the following contributions to $F(\omega)$:

$$2D_2 \cos(2\omega Vs) \cdot H(\omega)$$

$$2D_3 \cos(3\omega Vs) \cdot H(\omega).$$

Without any difficulty these considerations may be extended to a filter having an arbitrary number $(X+1)$ of sets. When the constants $D_x$ satisfy the relation $$D_{-x} = D_x \text{ with } x = 1, 2, \ldots . X/2 \quad (25)$$

the sets having the same transfer function $D_x \cdot H(\omega)$ jointly provide a contribution:

$$2D_x \cos(x\omega Vs) \cdot H(\omega) \quad (26)$$

and the complete transfer function $F(\omega)$ may be written as:

$$F(\omega)=H(\omega)\cdot\left[D_0+\sum_{x=1}^{X/2}2D_x\cos(x\omega Vs)\right]$$

$$=H(\omega)\cdot N_c(\omega) \quad (27)$$

in which the already mentioned constant delay is left out of consideration.

When in combination network 5 the output signals of the sets 11, 12, 13 are subtracted from the output signals of the sets 7, 8, 9, in other words when the constants $D_x$ satisfy the relation $$D_{-x}=-D_x \text{ with } x=1,2,\ldots,X/2 \quad (28)$$

and when furthermore the constant $D_0$ of the central set 10 is rendered equal to zero, the following relation is obtained for the complete transfer function $F(\omega)$ of the filter in FIG. 7, apart from a phase shift $\pi/2$:

$$F(\omega)=H(\omega)\cdot\left[\sum_{x=1}^{X/2}2D_x\sin(x\omega Vs)\right]$$

$$=H(\omega)\cdot N_s(\omega) \quad (29)$$

all further conditions being equal to those of the previous example.

As is evident from formulas (27) and (29) the desired transfer function $H(\omega)$, which limits the pulse spectrum in its bandwidth and whose periodicity according to formula (24) is given by $\Omega=2\pi/2$, is multiplied in both cases by a Fourier series $N_c(\omega)$ and $N_s(\omega)$, respectively, whose periodicity $\Omega_V$ is given by $$\Omega_V=2\pi/Vs \quad (30)$$

and thus is a factor of $V$ smaller than $\Omega$. This small periodicity $\Omega_V$ is, however, not annoying for the practical realization of the complete transfer function $F(\omega)$ as has already been described in the foregoing.

Likewise as in the filter of FIG. 4, components of the pulse spectrum applied to the filter of FIG. 7 can be suppressed with the aid of these Fourier series $N_c(\omega)$ and $N_s(\omega)$, to be indicated as zero point functions, at desired positions in the transmission band. When in the Fourier cosine series $N_c(\omega)$ all constants $D_x$ having even indices $x$ are rendered equal to zero, $N_c(\omega)$ always has zero points at the frequencies:

$$\omega=(2q+1)\cdot(\pi/2Vs) \text{ with } q=0,1,2,\ldots \quad (31)$$

independently of the values of the constants $D_x$ having odd indices $x$. Likewise the Fourier sine series $N_s(\omega)$ always has zero points at the frequencies $\omega=2q$ $$(\pi/2Vs)\cdot \text{ with } q=0,1,2,\ldots \quad (32)$$

independently of the values of the constants $D_x$. Exactly in the same manner as for the filter of FIG. 4 these zero points of $N_c(\omega)$ and $N_s(\omega)$ can be given a desired position in the transmission band by suitable choice of the delay $Vs$.

As noted hereinbefore the position of the zero points of $N_c(\omega)$ and $N_s(\omega)$ is independent of the values of the constants $D_x$, provided that for $N_c(\omega)$ all constants $D_x$ having even indices $x$ are equal to zero. This freedom in the choice of the constants $D_x$ makes it possible for the filter of FIG. 7 to give the zero point functions $N_c(\omega)$ and $N_s(\omega)$ a suitable form in the frequency intervals between their zero points, while the constants $D_x$ can be calculated in the manner already described with the aid of the known Fourier prescriptions corresponding to formulas (5) and (8), respectively.

Figure 8:
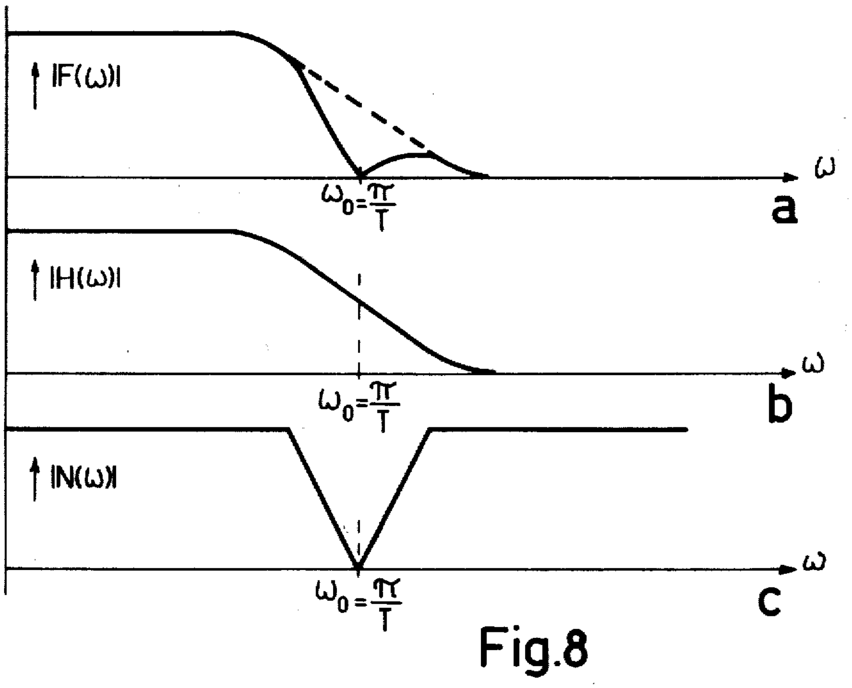
FIGS. 8 and 9 show some amplitude-versus-frequency characteristics to explain the operation of the filter of FIG. 7.

When a filter is desired whose total transfer function $F(\omega)$ realizes both a given bandwidth limitation of the pulse spectrum and a suppression of the spectrum components at suitable positions in the transmission band, the shape of the zero point functions $N_c(\omega)$ and $N_s(\omega)$ can be chosen to be such that this shape has an edge of prescribed slope in the zero points and has a constant value in the other intervals between the zero points. Consequently the variation of $F(\omega)$ in the frequency intervals between their zero points does not depend on the zero point functions $N_c(\omega)$ and $N_s(\omega)$ and this variation of $F(\omega)$ is thus only determined by $H(\omega)$. In this manner the additional degree of freedom in the choice of the constants $D_x$ may be advantageously utilized for a practical separation of the two requirements imposed on $F(\omega)$, namely a given bandwidth limitation and a suppression of given spectrum components, and this in the sense that the zero points of $H(\omega)$ are exclusively formed with the aid of $N_c(\omega)$ and $N_s(\omega)$ of suitable shape and that the requirement of bandwidth limitation is exclusively satisfied with the aid of $H(\omega)$. FIG. 8 shows an example of such a separation, the variation of $|F(\omega)|$ shown at *a* being desired. FIG. 8 shows that the desired variation of $|F(\omega)|$ can simply be separated into a bandwidth limitation in accordance with the $|H(\omega)|$ shown at *b* and a zero point function $|N(\omega)|$ of the shape shown at *c*.

In the example of FIG. 8 a zero point at the frequency $\omega=\omega_0=\pi/T$ is desired. The ideal zero point function for realisation of this zero point has the variation shown at *a* in FIG. 9 and thus has a periodicity $\Omega_V=4\omega_0$, from which the value of $T/2$ for the delay $Vs$ is obtained in accordance with formula (30). This ideal zero point function is then realized with the Fourier cosine series $N_c(\omega)$ of formula (27) in which, as stated, all constants $D_x$ having even indices $x$ are equal to zero. When this Fourier cosine series $N_c(\omega)$ is truncated after the second or third term, an approximation of the ideal variation shown at *a* is obtained which has an edge, that is already sufficiently steep for practical purposes, at the zero point for the frequency $\omega_0$, but fluctuates about a constant value in the band below the frequency $\omega_0$. This approximation by two or three terms is shown at *b* in FIG. 9 by the curve $N_{c3}(\omega)$ and $N_{c5}(\omega)$. As a result of these fluctuations the variation of $F(\omega)$ in the region below the frequency $\omega_0$ still depends on the zero point function.

The fluctuations of the zero point functions in the intervals between their zero points may, however, be completely eliminated when instead of the Fourier series development having a limited number of terms $X/2$ the associated Fejer series development is used for the approximation of the ideal zero point function. As is known, the Fejer series is formed by the arithmetical mean values of the partial sums of a Fourier series so that likewise a trigonometrical series is obtained whose coefficients $D'_x$ can be very simply calculated from the associated Fourier coefficients $D_x$ with the aid of the following relation:

$$D'_x = (1 - x/1+X/2) \ldots D_x \text{ with } x = 0, 1, 2, \ldots X/2 \quad (33)$$

Figure 9:
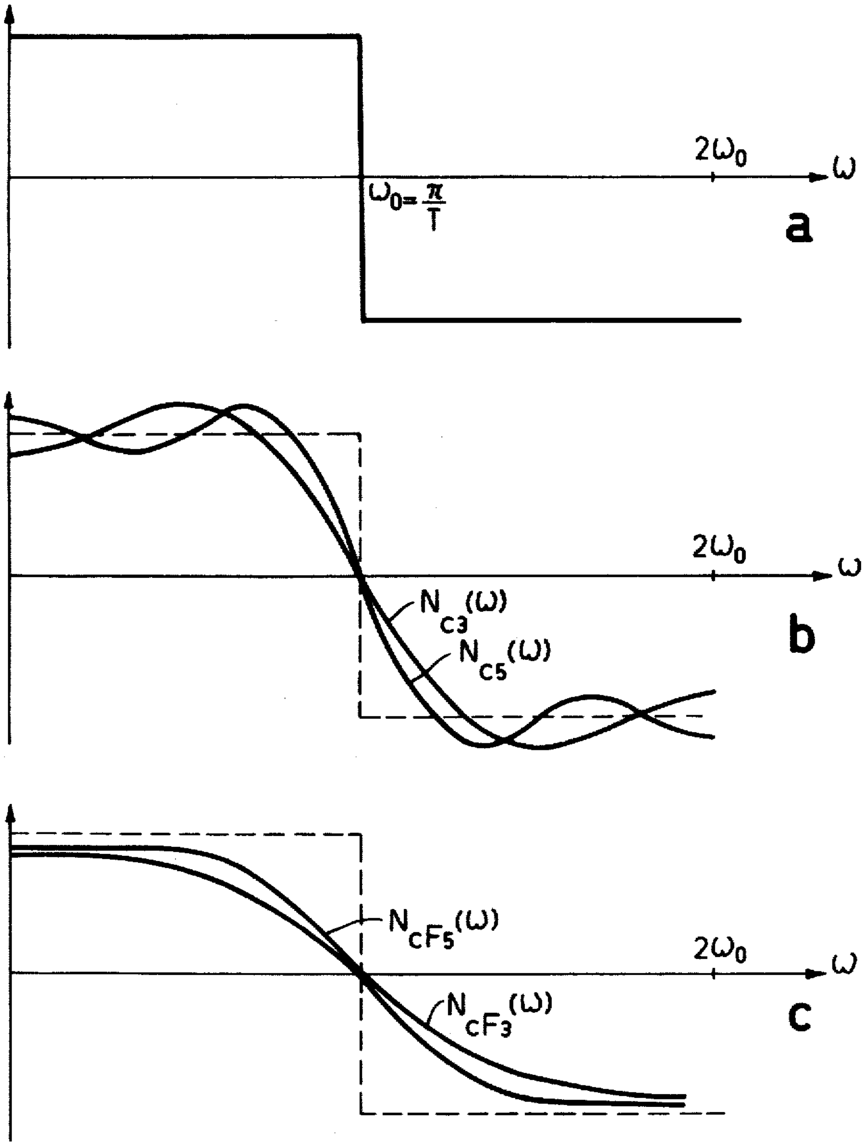

FIG. 9 shows at $c$ the Fejer cosine series $N_{cF3}(\omega)$ and $N_{cF5}(\omega)$ associated with the Fourier cosine series $N_{c3}(\omega)$ and $N_{c5}(\omega)$, respectively, from which it is evident that in the range below the frequency $\omega_o$ the fluctuations of the zero point function have completely disappeared and hence the variation of the complete transfer functions $F(\omega)$ below the frequency $\omega_o$ is substantially independent of the zero point function.

In this manner the desired bandwidth limitation and the desired suppression of given spectrum components in the transmission band can be realized substantially independently of each other in the filter according to the invention shown in FIG. 7. In addition a complete transfer function $F(\omega)$ can be obtained with an accurately linear phase-versus-frequency characteristic because each of the two multiplicative constituent parts $H(\omega)$ as well as $N_c(\omega)$ or $N_s(\omega)$, can be realized with a linear phase-versus-frequency characteristic, as has extensively been described in the foregoing, and the complete phase-versus-frequency characteristic is obtained by addition of these two linear phase-versus-frequency characteristics.

Figure 10:
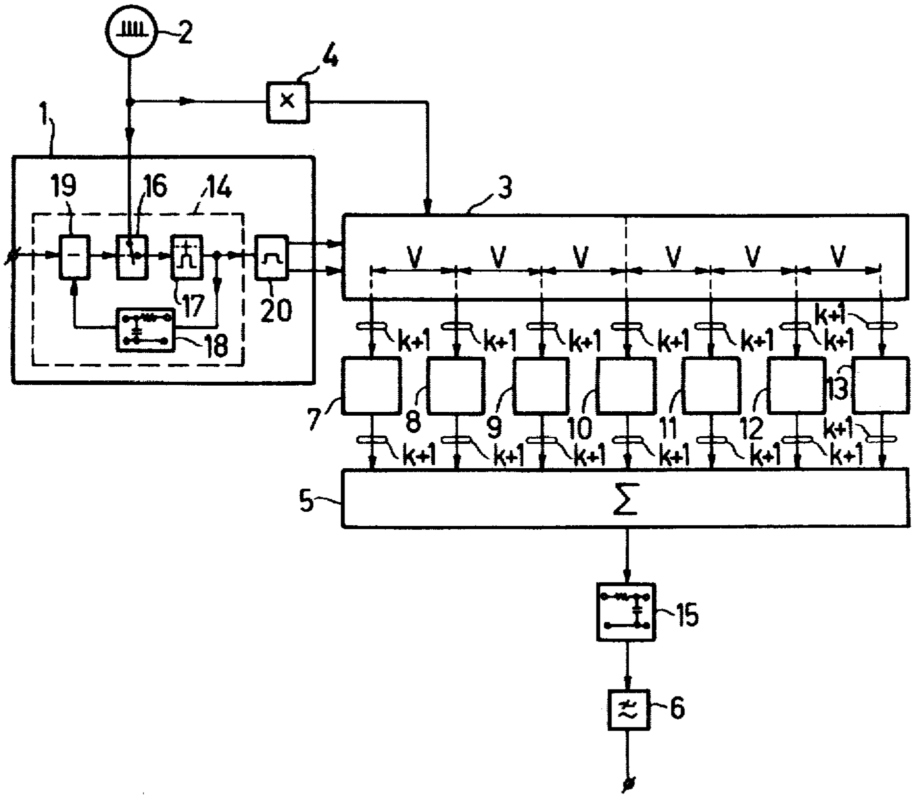
FIG. 10 shows a modification of the filter shown in FIG. 7 for analog signals.

The filters described so far may not only be used for binary pulse signals having a rectangular shape, but also for analog signals such as data signals transmitted in a limited frequency band. FIG. 10 shows a modification of the filter of FIG. 7 according to the invention which is adapted for analog signals of this kind. To this end the signal source 1 connected to shift register 3 is provided with an analog-to-digital converter 14 which converts the analog signal to be filtered into a pulse series characterizing this signal. Furthermore a digital-to-analog converter 15 is arranged in cascade with the analog-to-digital converter 14 and the shift register 3. This digital-to-analog converter 15 is the inverse of the analog-to-digital converter 14 as regards its influence on the analog signal to be filtered, which means that in case of a direct supply of the output pulses from the analog-to-digital converter 14 to the digital-to-analog converter 15 an analog signal is produced which, apart from the quantisation inaccuracy, corresponds to the analog signal applied to the analog-to-digital converter 14.

As already extensively described in Netherlands Pat. application No. 6602900 the filtering of the analog signal is established by the filtering action of the arrangement consisting of the shift register 3, the sets 7–13 of weighting networks connected thereto and the combination network 5, on the output pulses of the analog-to-digital converter 14, which filtering action in addition is completely independent of the pulse code used for the analog-to-digital conversion. The further description is therefore limited to only one pulse code, while for other pulse codes reference is made to the above-mentioned patent application.

Particularly in FIG. 10 a delta modulator is used as an analog-to-digital converter 14, which modulator is formed by a pulse code modulator 16 connected to a pulse generator whose output pulses are applied through a pulse regenerator 17 to a digital-to-analog converter 18 in the form of an integrating network. The output signal from the integrating network and the analog signal to be filtered are applied to a difference producer 19 for obtaining a difference signal which drives the pulse code modulator 16. The pulses for the pulse code modulator 16 are derived in the relevant embodiment from the same pulse generator which provides the shift pulses for the shift register 3 through the subsequent frequency multiplier 4. The digital-to-analog converter 15 associated with delta modulator 14 has the form of an integrating network which corresponds to the integrating network 18 in delta modulator 14.

In delta modulator 14, pulses having a repetition frequency which is at least twice the highest frequency in the analog signal to be filtered are applied in by pulse generator 2 to pulse code modulator 16. When this signal is located, for example, in the frequency band of from 0 to 1 kHz, this repetition frequency is, for example, 10 kHz. Dependent on whether the instantaneous value of the output signal from the integrating network 18 is smaller or larger than the analog signal at the input of difference producer 19, a difference signal of negative or positive polarity is produced at the output of difference producer 19. Dependent on this polarity of the difference signal the pulses originating from pulse generator 2 occur or do not occur at the output of pulse code modulator 16. These pulses are applied to the integrating network 18 through the pulse regenerator 17 for suppressing the variations in amplitude, duration, shape or instant of occurrence produced in the pulse code modulator 16. The time constant of this integrating network is, for example, 10 msec.

The above-described loop has the tendency to render the difference signal zero. When, for example, a difference signal of negative polarity occurs, a pulse is applied to the integrating network 18 which counteracts the negative difference signal, while conversely the integrating network 18 does not receive a pulse in case of a positive difference signal which counteracts the further continuance of the positive difference signal. Consequently, the signal appearing at the output of the integrating network 18 represents a quantized approximation of the analog signal to be filtered. A series of pulses then occurs at the output of the delta modulator 14 in which series the pulses characterize the analog signal by their presence and absence.

The pulse series provided by delta modulator 14 is applied through a pulse widener 20 to the shift register 3 which is connected through the sets 7–13 of weighting networks to the combination network 5 whose output is connected to the digital-to-analog converter 15. As extensively described in the above-mentioned patent application, the filtering of the analog signal is exclusively brought about by the filtering action which is exerted by the arrangement constituted by shift register 3, the sets 7–13 of weighting networks connected thereto and the combination network 5 on the output pulses of delta modulator 14. Consequently, the complete transfer function of the filter in FIG. 10 for analog signals accurately corresponds to the complete transfer function $F(\omega)$ of the filter in FIG. 7 for binary pulse signals.

The filter of FIG. 10 may be used to special advantage for obtaining narrow-band stop filters, for example, for stopping pilot signals which are located in or in the vicinity of the transmission band of band-limited data signals. In fact, just as the filter of FIG. 7, the filter of FIG. 10 has a, linear phase-versus-frequency characteristic and thus does not exhibit any phase distortion when stopping the pilot signals, which is in clear contrast to conventional stop filters in which the phase distortion extends over a frequency range which is considerably larger than the actual stop band so that inadmissible distortion is caused in the pulse signals.

What is claimed is:

1. A filter for binary pulse signals derived from a separate signal source controlled by a clock pulse generator, which filter is provided with a shift register connected to the signal source and having a number of shift register elements whose contents are shifted by a shift pulse generator connected to the shift register at a shift frequency which is equal to a multiple of the clock frequency, the shift register elements being connected through weighting networks to a combination network, characterized in that of the successive shift register elements a first group of $k$ successive shift register elements is connected to a first set of weighting networks for forming a first transfer function $H(\omega)$ limiting the pulse spectrum in its bandwidth, and furthermore at least a second group of $k$ successive shift register elements is connected to a second set of weighting networks for forming a second transfer function $D \cdot H(\omega)$ which is similar to the first transfer function where $D$ is a constant, corresponding weighting networks of the different sets being separated from one another by V shift register elements, the output signals from the weighting networks of the different sets being combined in the combination networks so as to suppress the components of the pulse spectrum at suitable positions in the transmission band.

2. A filter as claimed in claim 1, in which a number of $(X+1)$ sets of weighting network is connected to the shift register for forming a series of similar transfer functions $D_x \cdot H(\omega)$, the sets going from the input of the shift register to the output being enumerated in accordance with the series $X/2$, $X/2-1$, . . . . , 2, 1, 0, −1, −2, . . . . , $-X/2+1$, $X/2$ and $D_x$ being the constant associated with the set enumerated $x$ in this series, characterized in that for the suppression of spectrum components at positions in the transmission band which are independent of the values of the constants $D_x$, the constants $D_x$ having even indices $x$ are equal to zero and the constant $D_x$ having odd indices $x$ satisfy the relation $D_{\ x} = D_x$.

3. A filter as claimed in claim 1, in which a number of $(X+1)$ sets of weighting networks is connected to the shift register for forming a series of similar transfer functions $D_x \cdot H(\omega)$, the sets going from the input of the shift register to its output being enumerated in accordance with the series $X/2$, $X/2-1$, . . . . , 2, 1, 0, −1, −2, . . . . , $-X/2+1$, $X/2$ and $D_x$ being the constant associated with the set enumerated $x$ in this series, characterized in that for suppressing the spectrum components at positions in the transmission band which are independent of the values of the constants $D_x$, the constant $D_o$ is equal to zero and the other constants $D_x$ satisfy the relation $D_{-x} = -D_x$.

4. A filter as claimed in claim 2, characterized in that for forming a transfer function which varies between the desired suppression positions in the transmission band substantially in accordance with the said transfer function $H(\omega)$ limiting the pulse spectrum in its bandwidth the constants $D_x$ satisfy the relation $$D_x = (1 - x/1+X/2) \cdot D'_x$$

where $D'_x$ represents the coefficients in the Fourier series development of a transfer function whose zero points coincide with the said suppression positions and whose value between its zero points is constant, which constant has the same value, but an opposite sign in adjacent intervals between successive zero points.

5. A filter as claimed in claim 1 characterized in that for filtering analog signals the signal source connected to the shift register is provided with an analog-to-digital converter which converts the analog signal to be filtered into a pulse series characterizing said signal, said pulse series being applied to the shift register while furthermore a digital-to-analog converter is arranged in cascade with the analog-to-digital converter and the shift register.

6. A filter as claimed in claim 3, characterized in that for forming a transfer function which varies between the desired suppression positions in the transmission band substantially in accordance with the said transfer function $H(\omega)$ limiting the pulse spectrum in its bandwidth the constants $D_x$ satisfy the relation $$D_x = (1\ x/_{\ } 1+X/2) \cdot D'_x$$

where $D'_x$ represents the coefficients in the Fourier series development of a transfer function whose zero points coincide with the said suppression positions and whose value between its zero points is constant, which constant has the same value, but an opposite sign in adjacent intervals between successive zero points.

* * * * *

UNITED STATES PATENT AND TRADEMARK OFFICE

CERTIFICATE OF CORRECTION

PATENT NO. : 3,801,934

DATED : April 2, 1974

INVENTOR(S) : PETRUS JOSEPHUS VAN GERWEN

It is certified that error appears in the above-identified patent and that said Letters Patent are hereby corrected as shown below:

IN THE SPECIFICATION

Col. 6, line 58, "32" should be -- = --;

Col. 7, line 51, " $|H(\omega)|$ " should be -- $|\widetilde{H}(\omega)|$ --;

line 53, " $|H(\omega)|$ " should be -- $|\widetilde{H}(\omega)|$ --;

line 62, " $|H(\omega)|$ " should be -- $|\widetilde{H}(\omega)|$ --;

line 65, " $|H(\omega)|$ " should be -- $|\widetilde{H}(\omega)|$ --;

Col. 8, line 53, "f $(\omega)$" should be --F $(\omega)$--;

UNITED STATES PATENT AND TRADEMARK OFFICE

CERTIFICATE OF CORRECTION

PATENT NO. : 3,801,934 Page - 2

DATED : April 2, 1974

INVENTOR(S) : PETRUS JOSEPHUS VAN GERWEN

It is certified that error appears in the above-identified patent and that said Letters Patent are hereby corrected as shown below:

Col. 9, line 32, "$|H(\omega)|$" first occurence should be --$|\widetilde{H}(\omega)|$--; "accrdance" should be --accordance--;

line 34, "$|H(\omega)|$" should be --$|\widetilde{H}(\omega)|$--;

line 37, "$|H(\omega)|$" should be --$|\widetilde{H}(\omega)|$--;

line 46, in equation 21, "$F(\omega =$ " should read --$F(\omega) =$ --;

Signed and Sealed this

*sixth* Day of *January 1976*

[SEAL]

*Attest:*

RUTH C. MASON
*Attesting Officer*

C. MARSHALL DANN
*Commissioner of Patents and Trademarks*

UNITED STATES PATENT AND TRADEMARK OFFICE

CERTIFICATE OF CORRECTION

PATENT NO. : 3,801,934

DATED : April 2, 1974

INVENTOR(S) : PETRUS JOSEPHUS VAN GERWEN

It is certified that error appears in the above-identified patent and that said Letters Patent are hereby corrected as shown below:

IN THE SPECIFICATION

Col. 4, line 56, equation 10 should read:

$$--C_p = \frac{4}{5\pi} \cdot \frac{\sin(\pi p/5)}{1-0.04p^2} --;$$

Col. 7, line 41, in equation 17 "$C'_p = C''_p = \sin(\pi p/5)/\pi p$"

should be:

$$--C'_p = C''_p = \frac{\sin(\pi p/5)}{\pi p} --;$$

Col. 13, line 6, equation 33 should read:

$$--D'_x = \left(1 - \frac{x}{1+X/2}\right) ..D_x \text{ with } x = 0, 1, 2, ...X/2--;$$

IN THE CLAIMS

Claim 4, line 7, the equation should read:

$$--D_x = \left(1 - \frac{x}{1+X/2}\right) .D'_x --;$$

Claim 6, line 7, the equation should read:

$$--D_x = \left(1 - \frac{x}{1+X/2}\right) . D'_x --;$$

Signed and Sealed this

*third* Day of *February 1976*

[SEAL]

*Attest:*

RUTH C. MASON
*Attesting Officer*

C. MARSHALL DANN
*Commissioner of Patents and Trademarks*